(No Model.)

W. H. PIKE.
GAS STOVE.

No. 404,052. Patented May 28, 1889.

WITNESSES:
Edw. F. Tourtellotte.
N. M. Bonacum.

INVENTOR,
W. H. Pike
BY L. E. Field
ATTORNEY.

UNITED STATES PATENT OFFICE.

WILLIAM HENRY PIKE, OF LONDON, ENGLAND.

GAS-STOVE.

SPECIFICATION forming part of Letters Patent No. 404,052, dated May 28, 1889.

Application filed November 9, 1888. Serial No. 290,344. (No model.) Patented in England December 24, 1887, No. 17,707.

*To all whom it may concern:*

Be it known that I, WILLIAM HENRY PIKE, of London, England, have invented a certain new and useful Improvement in Gas-Stoves, (for which I have obtained Letters Patent in England, No. 17,707, dated December 24, 1887,) of which the following is a full, clear, and exact description.

The object of my invention is to provide a heater or stove of convenient size and of simple construction, adapted for detachable connection to an ordinary gas-burner, and wherein the complete and perfect combustion of the gas and the production of steady and intense heat are assured and waste of gas or of the heat radiated as a result of its combustion is prevented.

The invention consists in the construction, arrangement, and combination of parts hereinafter particularly described and claimed.

Reference is to be had to the accompanying drawings, forming a part of this specification, in which similar letters of reference designate corresponding parts in both views.

Figure 1:
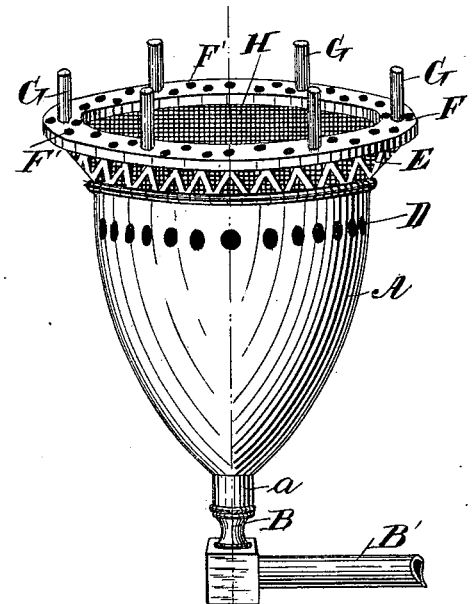
Figure 2:
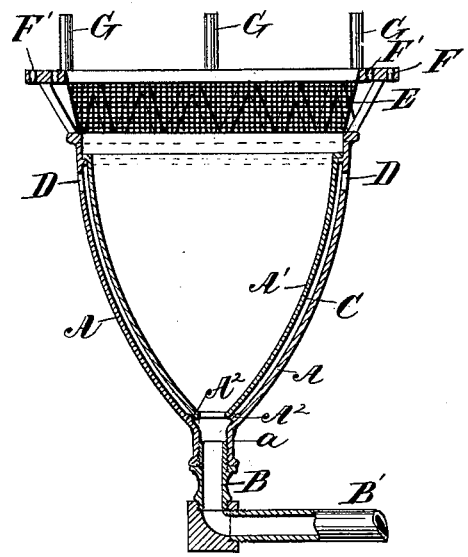

Figure 1 is a perspective view of a gas stove or heater constructed in accordance with my invention in position for use; and Fig. 2 is a central vertical sectional view of the same, taken on the line $x$ $x$ in Fig. 1.

The stove or heater consists, mainly, of a metal casing and a heater or urn supported within the casing. The casing A is here shown as having, essentially, the contour of an inverted cone, but may have any other preferred configuration. Said casing is open at its upper end and has at its lower end an integral sleeve, $a$, adapted to be fitted upon a gas-burner, B, of ordinary construction, connected to a gas-supply pipe, B', (shown only in part.)

Within the casing A and over the burner B, projecting therein, is supported by brackets or stays A², or by other suitable means, a heating-drum, A', open at both ends and corresponding in shape to but slightly smaller than the casing A, said casing and drum being so arranged, the one within the other, as to provide a space, C, intervening the same, into which lead a series of apertures, D, provided in the casing A, the rim of the drum extending a short distance above the line of said apertures.

Upon the rim of the casing A is supported by a zigzag frame, E, an annular plate, F, provided with a series of upwardly-ranging openings, F', and a series of vertical pins, G, the latter being adapted to support a vessel or utensil the contents of which are desired to be heated, the space between the plate F and the rim of the casing A being spanned by wire netting or gauze H, to allow inlet of air to cool the upper end of the casing.

In operation the gas which enters the stove or heater from the supply-pipe B' through the burner B rushes with great force into the drum A', thus creating a vacuum in the space C between the drum and the casing, and passes to the top of the drum, out at the openings in the plate F, where it is ignited. The creation of a vacuum in the space C causes air to be drawn in at the apertures D in the casing A, which air passes downward through said space and is heated therein, and then passes past the burner B into the drum A', where it mingles with the gas therein, is carried upward to the top of the drum, and passes out therewith through the openings in the plate F, mingling with the ignited gaseous mixture, intensifying the heat thereof and raising the temperature of the utensil that may be resting upon the pins G, or raising the temperature of the air of the room. The casing A, being separated from the drum A' by the air-space C on the one side and being exposed to the air of the room upon the other side, is kept cool relatively to the drum, and thus prevents any loss of the heat radiated from the drum A'. The great quantity of air which is supplied, as above described, to the gaseous mixture insures complete, perfect, and effective burning of said mixture and the production of steady and intense heat.

It will be understood that while I have shown in the drawings a specific construction of the stove or heater, I do not limit myself thereto, as such construction may be varied without departing from the spirit of my invention. Chafing-dishes and similar heating devices also may be constructed in accordance with the terms of my invention and employed with results equally satisfactory to those hereinbefore specified.

Having thus fully described my invention, what I claim as new, and desire to secure by Letters Patent, is—

In a gas stove or heater, the combination, with the casing A, adapted to be fitted upon a gas-burner and provided with the circular series of inlet-apertures D, and the drum A', open at both ends, supported within and concentric with said casing, providing the air-space C therebetween, of the plate F, supported on the rim of said casing and provided with the series of upwardly-ranging outlet-apertures F', and the series of vertical pins G, and the wire netting or gauze H, arranged between the casing A and the lower outer edge of said plate, substantially as shown and described.

In testimony that I claim the foregoing as my invention I have signed my name, in presence of two witnesses, this nineteenth (19th) day of September, 1888.

WILLIAM HENRY PIKE.

Witnesses:
WALTER V. HOUGHTON,
T. A. FIRSTENHOFF.